United States Patent
Bjerg et al.

(10) Patent No.: US 9,601,962 B2
(45) Date of Patent: Mar. 21, 2017

(54) WIND TURBINE, A GENERATOR, A ROTOR HOUSING, AND A METHOD FOR MAKING THE ROTOR HOUSING

(71) Applicant: SIEMENS AKTIENGESELLSCHAFT, Müchen (DE)

(72) Inventors: Anders Sylvester Bjerg, Brande (DK); Thomas Soerensen, Lunderskov (DK); Ashkan Vaziri Tehrani, Hedensted (DK)

(73) Assignee: SIEMENS AKTIENGESELLSCHAFT (DE)

( * ) Notice: Subject to any disclaimer, the term of this patent is extended or adjusted under 35 U.S.C. 154(b) by 192 days.

(21) Appl. No.: 14/320,827

(22) Filed: Jul. 1, 2014

(65) Prior Publication Data
US 2015/0061295 A1    Mar. 5, 2015

(30) Foreign Application Priority Data

Sep. 3, 2013   (EP) .................................... 13182852

(51) Int. Cl.
*H02K 5/04*       (2006.01)
*H02K 7/18*       (2006.01)
(Continued)

(52) U.S. Cl.
CPC .............. *H02K 5/04* (2013.01); *F03D 9/002* (2013.01); *H02K 7/1838* (2013.01);
(Continued)

(58) Field of Classification Search
CPC ........ H02K 5/04; H02K 7/1838; H02K 15/14; F03D 9/002
(Continued)

(56) References Cited

U.S. PATENT DOCUMENTS 8,174,135 B1 * 5/2012 Roe .................... F03B 13/16
290/43
2009/0309365 A1 * 12/2009 Sauer .................. F03B 13/12
290/53

(Continued)

FOREIGN PATENT DOCUMENTS

EP         1257037 A1    11/2002
EP         2590301 A1     5/2013
WO    WO 2013174566 A2   11/2013

OTHER PUBLICATIONS

Extended Search Report for European Application No. 13182852.7, mailed Feb. 20, 2014.

*Primary Examiner* — Naishadh Desai
(74) *Attorney, Agent, or Firm* — Schmeiser Olsen & Watts LLP

(57) ABSTRACT

Described is a wind turbine, a generator and a rotor housing for a generator with an external rotor, the rotor housing comprising a support structure, wherein the support structure is cylindrical shaped, a cone and a ring. The ring and the cone are attached together at an inner side of the cone in a horizontal plane, forming a front part of the rotor housing. The support structure is attached to the cone at a front end of the support structure, forming a side part of the rotor housing, and the support structure is formed out of segmented support structure parts. Also disclosed is the method for making the rotor housing.

15 Claims, 4 Drawing Sheets

(51) Int. Cl.
*F03D 9/00* (2016.01)
*H02K 15/14* (2006.01)
*H02K 1/27* (2006.01)

(52) U.S. Cl.
CPC ........... *H02K 15/14* (2013.01); *H02K 1/2786* (2013.01); *Y02E 10/725* (2013.01); *Y10T 29/49009* (2015.01)

(58) Field of Classification Search
USPC ........................................ 310/89; 290/44, 55
See application file for complete search history.

(56) References Cited

U.S. PATENT DOCUMENTS

| 2012/0181792 A1 | 7/2012 | Pettersen et al. |
| 2013/0062884 A1* | 3/2013 | Bonomi ................ F03D 9/002 290/55 |
| 2013/0241365 A1 | 9/2013 | Booth et al. |

* cited by examiner

WIND TURBINE, A GENERATOR, A ROTOR HOUSING, AND A METHOD FOR MAKING THE ROTOR HOUSING

CROSS-REFERENCE TO RELATED APPLICATIONS

This application claims priority to EP Application No. 13182852.7, having a filing date of Sep. 3, 2013, the entire contents of which are hereby incorporated by reference.

FIELD OF TECHNOLOGY

The following relates to the field of wind turbines.

BACKGROUND

The rotor of a direct drive generator for wind turbines has a diameter of more than 4 m (meters), dependent on the generator power and torque. The generator rotor of the Siemens Wind Power direct drive turbines for example has an outer diameter of 4.2 m for the SWP 3.0-101 and an outer diameter of 6.5 m for the SWP 6.0-154 and a length of around 2.5 m.

The rotor consists of a front plate and a rotor ring with a certain yoke height. The complete rotor is also called rotor housing because in the Siemens Wind Power direct drive turbines the rotor is located outside of the stator and acts therefore like a house. The rotor outer surface is directly in contact with the ambient air.

The rotor housing of all the direct drive Siemens Wind Power generators is a single welded and machined steel component. The rotor housing consists of two large cones, which are welded together with a forged steel ring and a rolled steel yoke. This rotor housing is then machined in a large CNC machine. That process is taking a very long time and requires very fine tolerances. Therefore, the rotor housing is fixed in a large tool, while it is machined in order to keep the roundness of the yoke. This makes it expensive, especially for bigger diameter like on the 6.0 MW generators, and the number of suppliers who can deliver such a steel component is limited. Furthermore there may be occur issues in the supply chain with this manufacturing process due to the total process time.

Therefore, the supply chain is limited to few suppliers who are capable of handling parts on the size of the rotor housing described before, and all suppliers have in common that they need to invest in new equipment and machinery in order to be able to produce such rotor housings. For example, a milling machine capable of machining a rotor housing for a 6.0 MW (megawatt) turbine may costs some millions of Euro, with a capacity of maybe roughly below one hundred units per year. Suppliers going for such an investment may require a longterm commitment from a wind turbine provider, which may limit the possibilities for changing design and supply setup of a wind turbine. Moreover, such a wind turbine provider may also be limited to only use suppliers close to the wind turbine provider production facilities, due to the high cost and limitations related to transportation of the rotor housing.

EP 2578872 discloses a generator, particularly for a wind turbine, having a rotor and a stator, whereby the rotor comprises at least one disc-like shaped rotor end plate supporting the rotor and the stator comprises at least one disc-like shaped stator end plate supporting the stator, wherein the at least one rotor end plate and/or the at least one stator end plate at least partially extends tilted relative to the center axis of the generator. An aspect is to provide a generator with improved mechanical stability.

The problem is to produce such a rotor with the given dimensions in a serial production in a more cost and time efficient way. Only a couple of suppliers worldwide are able to produce such large, single welded and machined steel components with the needed precision regarding component tolerances in the field of wind turbines. In addition the rotor needs to be transported from the supplier to the wind turbine provider, which is costly for the given dimensions.

WO2011031165 discloses a wind turbine comprising an integrated and segmented permanent magnet generator without the traditional end covers with bearings and shaft making it possible to manufacture and transport generator segments consisting of both generator stator and rotor segments as ready to assemble and already positioned to each other as easy transportable elements to an assembly place where they are integrated with the generator rotor and bearing system of the wind turbine to form a complete wind turbine driveline with blades, hub, bearing unit and an integrated permanent magnet generator with concentric air gap between generator stator and rotor. The generator has an external stator and an internal rotor.

EP2590301 discloses generator assembly, particularly for a wind turbine, having a generator with a segmented rotor comprising a number of rotor segments and a segmented stator comprising a number of stator segments, wherein radially oppositely disposed rotor and stator segments each comprise at least one reception portion for detachably receiving at least one connection means, with the connection means being adapted to detachably mechanically connect respective radially oppositely disposed rotor and stator segments to build stator-rotor-segment-units.

Hence, there may be a need to produce a direct drive generator with an external rotor in an easier and cost reducing manner.

SUMMARY

This need may be met by the subject matter according to the independent claims. Advantageous embodiments of the present invention are described by the dependent claims.

According to a first aspect there is provided a rotor housing for a generator with an external rotor, the rotor housing comprising a support structure, wherein the support structure is cylindrical shaped, a cone and a ring. The ring and the cone are attached together at an inner side of the cone in a horizontal plane, forming a front part of the rotor housing. The support structure is attached to the cone at a front end of the support structure, forming a side part of the rotor housing, and the support structure is formed out of segmented support structure parts.

The support structure may be the yoke of the rotor housing. The segmented support structure parts may be mounted on the cone, which may be a single piece front plate, with bolts. The segmented support structure parts may also be bolted together with each other.

The advantage of this concept is that the segmented support structure parts may be landed on a rigid and well defined cone, which may make it possible to control the fine tolerances. The segmented support structure parts may be made of simple rolled, possibly welded and machined steel plates. It may also be possible to use different materials for the segmented support structure parts and the cone.

Based on the idea that a segmented rotor housing concept makes a provider of wind turbines capable of utilizing a wide range of suppliers with existing production setups located globally, which may render such a provider acting more flexible on different demands from different areas in the world. The segmented support structure parts may be packed in containers and shipped to a wind power provider production site from all over the world at a low cost. The solid segmented rotor housing concept is solving at least the problem about the manufacturing process of the rotor housing, which until now has been manufactured as one single component. By splitting the rotor housing into multiple segments or modules, each component may be simpler to manufacture individually, and it may become possible to use smaller machines for manufacturing of each of the segmented support structure parts, which again may make procurement of the components more flexible with possible lower prices as the result. It may even become easier to find capable suppliers worldwide with the right competences and machinery within steel forming, welding, CNC machining and surface treatment, when the single components are smaller and with lower complexity. Furthermore it may also be easier and more cost optimal to setup automated or semi-automated manufacturing lines, using welding robots, automated CNC machine loading and automated surface treatment systems, when the components are smaller and the total number of parts are higher. This again may lead to a more efficient manufacturing process, approaching the line production typically seen within the automotive industry.

According to a further embodiment of the invention the cone is formed out of segmented cone parts.

The segmented support structure parts as solid rotor housing segment may be mounted on the segmented cone parts. Therefore, the rotor housing may be even more segmented, such that segment modules may be provided, wherein each segment module comprises a segmented support structure part and a segmented cone part. These segment module parts may be produced independently and made of different material.

This embodiment is based on the idea that all sub parts of the rotor housing may be small and therefore easier to transport and handle. These segments may be optimized for shipment in standard containers.

According to a further embodiment the number of segmented support structure parts equals the number of segmented cone parts.

The segmented support structure parts and the segmented cone parts each may be made as one piece items, where these single steel plates may be welded, riveted or bolted to each other.

This embodiment is based on the idea that attaching one segmented cone part together with one segmented support structure part, may simplify the assembling process of the rotor housing.

According to a further embodiment each segmented support structure part comprises at least a part of a segmented cone part.

This embodiment is based on the idea that if a segmented support structure part comprises at least a part of a segmented cone part, it may be easier to control the small predetermined tolerances for the rotor housing of a generator used in wind turbines. This may result from the need of a very precisely produced ring for the bearing, to produce a high reliable wind turbine generator.

According to a further embodiment the support structure is formed out of six segmented support structure parts.

By forming the support structure out of six segmented support structure parts, it may be found a balance between segmenting the support structure by use of segmented support structure parts in order to receive segment modules of a rotor housing, which are more simple to handle and having not too many segments of the rotor housing, as too many segments may lead to instabilities in the rotor housing structure. But even 4 or 8 or other different numbers of segmented support structure parts may be used, depending on the size of the rotor housing and/or maybe occurring stability issues. Therefore, in general any quantity of segmented support structure parts may be used, as long as it may support the stability of the rotor housing or at least does not lead to certain instabilities of the rotor housing.

This embodiment is based on the idea that too many segment modules of the rotor housing of a generator used in wind turbines may cause instability issues for the rotor housing.

According to a further embodiment each segmented cone part comprises a straight shaped side, wherein the straight shaped side of the corresponding segmented cone part is opposed to a further side of this segmented cone part attached to the ring, thus the segmented cone parts together provide a hexagonal shape around the ring.

By forming the support structure out of six segmented support structure parts, it may be easy to receive a hexagonal shape around the ring, in particular if each segmented support structure part comprises at least a part of a segmented cone part.

A hexagonal segmented support structure and cone may have the advantage of being very easy to manufacture from smaller subparts. No welds may be required, since the segments may be made of formed and machined plates. For example, the support structure then may be made of segmented rolled and machined plates providing the segmented support structure parts, while the cone may be made of segmented flat plates with for example two bends each or may be even made of forged steel parts providing the segmented cone parts. It may be also possible to use different materials for the segmented support structure parts and for the segmented cone parts.

This embodiment is based on the idea that a hexagon shape around the ring will lead to six straight edges, which may make it easier to control the small predetermined tolerances for the rotor housing of a generator used in wind turbines.

According to a further embodiment each segmented cone part is attached to one support structure part and to the ring, each by bolting.

Instead of bolting it may be also possible to weld the parts together and to the ring or to rivet them together. For example, bolting may be a preferred way of attaching each segmented cone part to one support structure part and to the ring.

This embodiment is based on the idea that by using bolts for attaching each segmented cone part to one support structure part and to the ring it may be simple to adjust the parts to each other so as to not excess the predefined tolerances for the rotor housing.

According to a further embodiment each segmented support structure part is attached to another support structure part by bolting.

This embodiment is based on the idea that by using bolts for attaching each segmented support structure to another support structure part it may be simple to adjust the parts to each other so as to not excess the predefined tolerances for the rotor housing.

According to a further embodiment a gap is formed between two segmented support structure parts being attached to each other.

Such elongate gap between two neighbouring segmented support structure parts may be beneficial in order to provide a tolerance control for the segmented support structure parts as the side part of the rotor housing.

This embodiment is based on the idea that by using gaps between segmented support structure parts a simple way of a tolerance control for the rotor housing may be provided.

According to a further embodiment the gap between two segmented support structure parts being attached to each other, is between 0 mm (millimeter) and 2 mm, or between 0 mm and 1 mm, or between 0 mm and 0.5 mm.

The size of the gap may be dependent on the quantity of segmented support structure parts as well as dependent on the predefined tolerances for each segmented support structure part.

This embodiment is based on the idea that such segmented support structure parts may be produced by maintaining small tolerances for each segmented support structure part without encountering certain issues.

According to a further embodiment the ring is adapted to provide a housing for the bearing of the generator.

This embodiment is based on the idea that it may be beneficial to not segment the housing of the bearings of the generator, as this may lead to issues when trying to arrange the bearings, as any tolerances between segments of a segmented housing may be disadvantageous while operating the generator.

The ring according may be used to receive the bearings used for the rotation of the rotor, and therefore may act as a one piece bearing housing. Therefore, such a bearing housing may consist of a forged and machined steel ring. Therefore, the ring will not be segmented as the other parts of the rotor housing. This makes it simple to include the bearings of the generator into the ring, such that the ring may provide the housing of the bearing.

According to a further aspect there is provided a generator with an external rotor, the generator comprising a rotor housing according to any of the embodiments of the preceding aspects of the invention.

According to a further aspect there is provided a wind turbine, comprising a generator device with an external rotor, and the generator comprising a rotor housing according to any of the embodiments of the preceding aspects of the invention.

According to a further aspect there is provided a method for manufacturing a rotor housing for a generator with an external rotor, the method comprising: Attaching a ring and a cone together at an inner side of the cone in a horizontal plane, forming a front part of the rotor housing, forming a support structure out of segmented support structure parts and attaching the support structure to the cone at a front end of the support structure, forming a side part of the rotor housing.

This aspect is based on the idea that a segmented rotor housing concept production method may lead to a production of a direct drive generator in an easier and cost reducing manner.

According to a further embodiment the method comprises forming the cone out of segmented cone parts.

This embodiment is based on the idea that including forming the cone out of segmented cone parts into the segmented rotor housing concept production method may lead to a production of a direct drive generator in an even easier and an increased cost reducing manner.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

Figure 5:
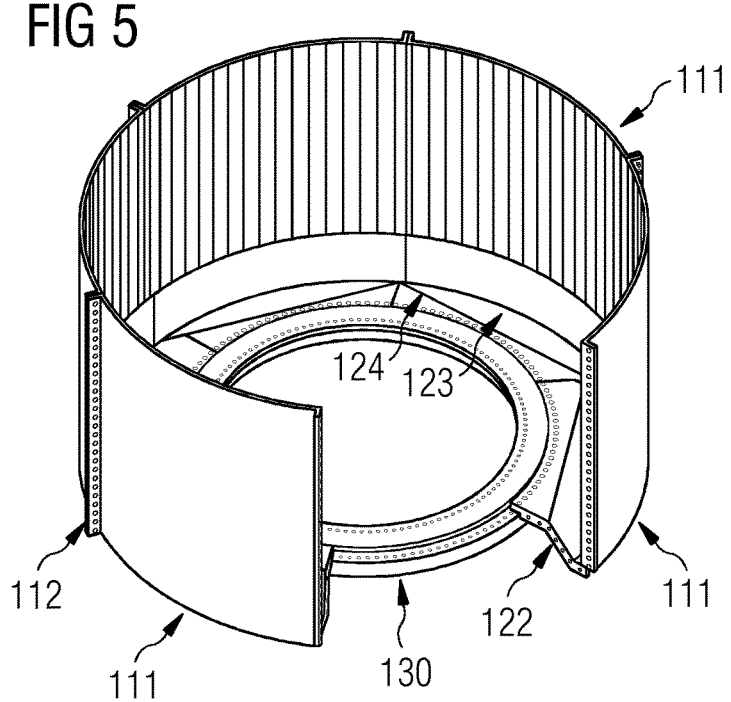
FIG. 5 shows a schematically three dimensional drawing of a part of a proposed rotor housing similar as shown in FIG. 4, but in contrary to FIG. 4 each of the segmented cone parts is made of one piece and then bended two times, for a generator with an external rotor according to an exemplary embodiment of the invention.
Figure 6:
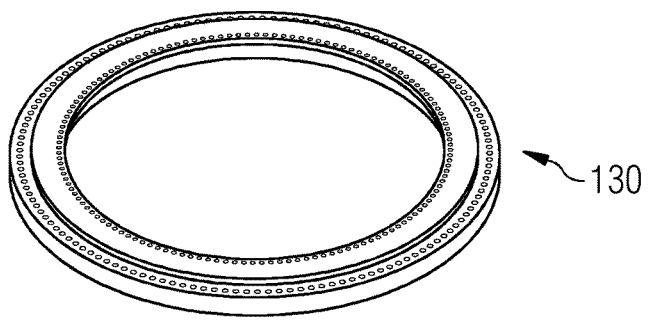
Figure 7:
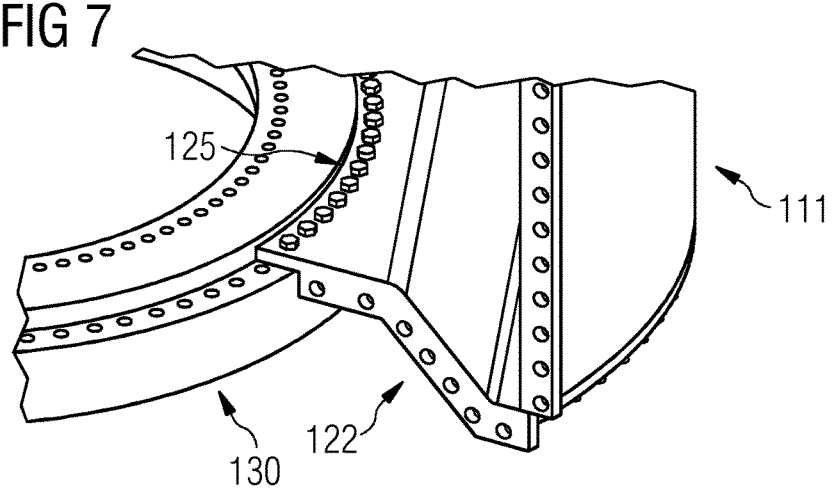

FIG. 6 shows a schematically three dimensional drawing of a proposed ring for a rotor housing for a generator with an external rotor according to an exemplary embodiment of the invention; and FIG. 7 shows a schematically three dimensional drawing of an enlarged extract of the part of a proposed rotor housing as shown in FIG. 5, for a generator with an external rotor according to an exemplary embodiment of the invention.

DETAILED DESCRIPTION

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 1A:
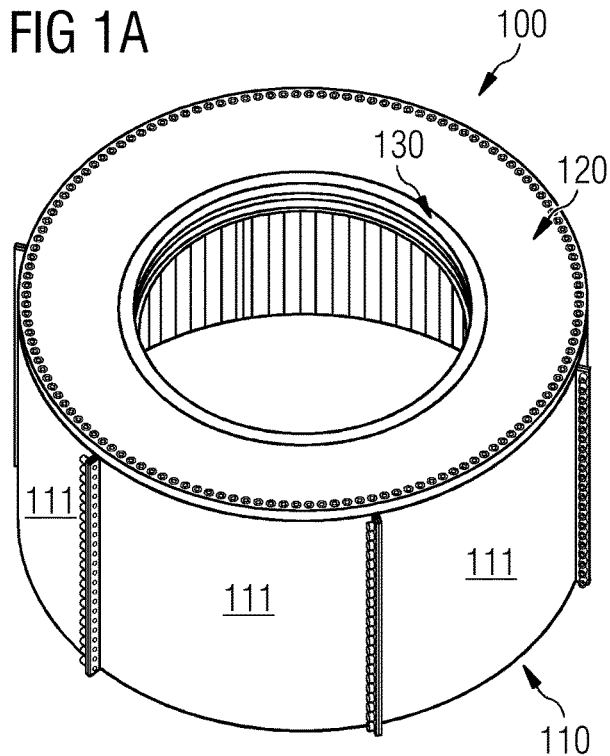
FIG. 1a shows a schematically three dimensional drawing of a proposed rotor housing for a generator with an external rotor according to an exemplary embodiment of the invention.

FIG. 1a shows a schematically three dimensional drawing of a proposed rotor housing 100 for a generator with an external rotor according to an exemplary embodiment of the invention. The rotor housing 100 for a generator with an external rotor comprises a support structure 110, wherein the support structure 110 is cylindrical shaped, a cone 120 and a ring. The ring 130 and the cone 120 are attached together at an inner side of the cone 121 in a horizontal plane, forming a front part of the rotor housing. The support structure 110 is attached to the cone 120 at a front end of the support structure 110, forming a side part of the rotor housing 100, and the support structure 110 is formed out of segmented support structure parts 111.

In FIG. 1a the rotor housing 100 is formed as a solid segmented concept including several segmented support structure parts 111 providing the support structure 110 of the rotor housing 100 and the one piece cone 120 is attached to the ring 130, thus providing a front plate of the rotor housing 100.

Figure 1B:
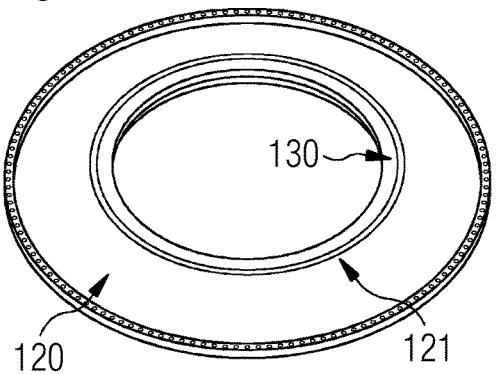
FIG. 1b shows a schematically three dimensional drawing of a proposed cone and a ring for a rotor housing as shown in FIG. 1a according to an exemplary embodiment of the invention.

FIG. 1b shows a schematically three dimensional drawing of a proposed cone 120 and a ring 130 for a rotor housing 100 as shown in FIG. 1a according to an exemplary embodiment of the invention. In FIG. 1b the one piece cone 120 is attached to the ring 130, thus providing the front plate for the rotor housing 100.

Figure 1C:
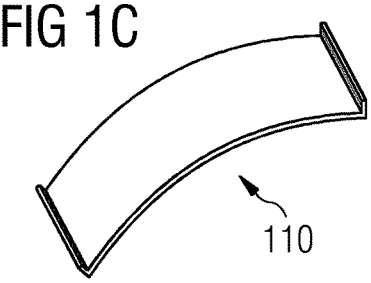
FIG. 1c shows a schematically three dimensional drawing of a proposed segmented support structure part for a rotor housing as shown in FIG. 1a according to an exemplary embodiment of the invention.

FIG. 1c shows a schematically three dimensional drawing of a proposed segmented support structure part 111 for a rotor housing 100 as shown in FIG. 1a according to an exemplary embodiment of the invention. In FIG. 1c only one segmented support structure part 111 of the support structure 110 shown in FIG. 1a is illustrated.

Figure 2A:
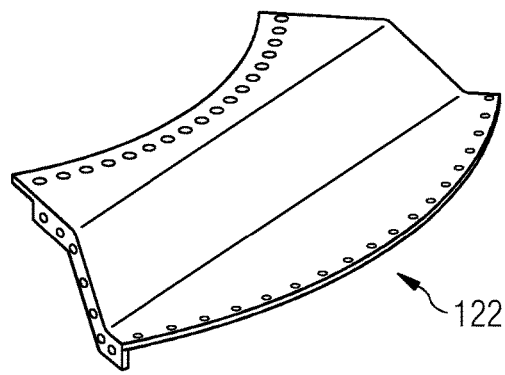
FIG. 2a shows a schematically three dimensional drawing of a first side view of a proposed segmented cone part for a cone as shown in FIG. 1b according to an exemplary embodiment of the invention.

FIG. 2a shows a schematically three dimensional drawing of a first side view of a proposed segmented cone part 122 for a cone 120 as shown in FIG. 1b according to an exemplary embodiment of the invention. The segmented cone part 122 has several holes for attaching it for example with bolts to the ring 130 and to a segmented support structure part 111, both shown in FIG. 1a to 1c.

Figure 2C:
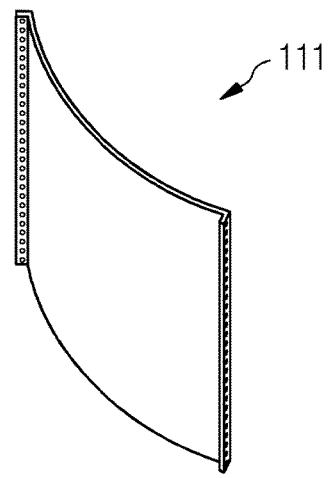
FIG. 2c shows a schematically three dimensional drawing of an outer side view of a proposed segmented support structure part for a rotor housing as shown in FIG. 1a according to an exemplary embodiment of the invention.
Figure 2B:
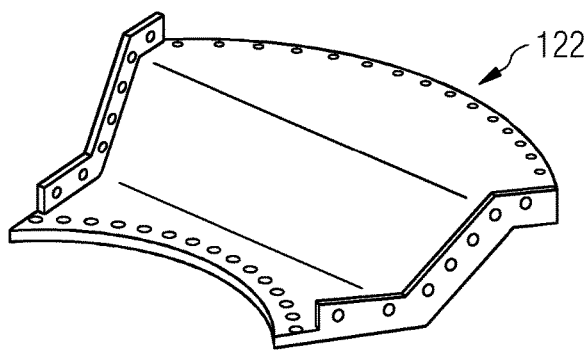
FIG. 2b shows a schematically three dimensional drawing of a second side view of a proposed segmented cone part for a cone as shown in FIG. 1b according to an exemplary embodiment of the invention.

FIG. 2b shows a schematically three dimensional drawing of a second side view of a proposed segmented cone part 122 for a cone 120 as shown in FIG. 1b according to an exemplary embodiment of the invention. In contrast to FIG. 2a, the segmented cone part 122 shown in FIG. 2a is rotated 90° counter clockwise. As can be seen, the segmented cone part 122 also has several holes at both its shorter sides, in order to provide a simple possibility to attach the segmented cone part 122 to another segmented cone part 122, for example by use of bolts. Several segmented cone parts 122 together with the ring 130 form the front plate of the rotor housing 100. This concept makes the front plate of the rotor housing 100 shown in FIG. 1a very industrialized, since it can be produced with limited amount of welding. These segmented cone parts 122 may be made as casted steel or more preferably of forged steel.

FIG. 2c shows a schematically three dimensional drawing of an outer side view of a proposed segmented support structure part 111 for a rotor housing 100 as shown in FIG. 1a according to an exemplary embodiment of the invention. Such segmented support structure parts 111 can be made as casted steel.

Figure 2D:
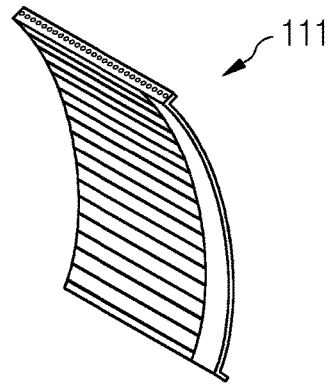
FIG. 2d shows a schematically three dimensional drawing of an inner side view of a proposed segmented support structure part for a rotor housing as shown in FIG. 1a according to an exemplary embodiment of the invention.

FIG. 2d shows a schematically three dimensional drawing of an inner side view of a proposed segmented support structure part for a rotor housing as shown in FIG. 1a according to an exemplary embodiment of the invention. From this side it can be seen, that the exemplary shown segmented support structure part 111 is rippled. Into these ripples the magnet modules (not shown) may be attached.

Figure 3:
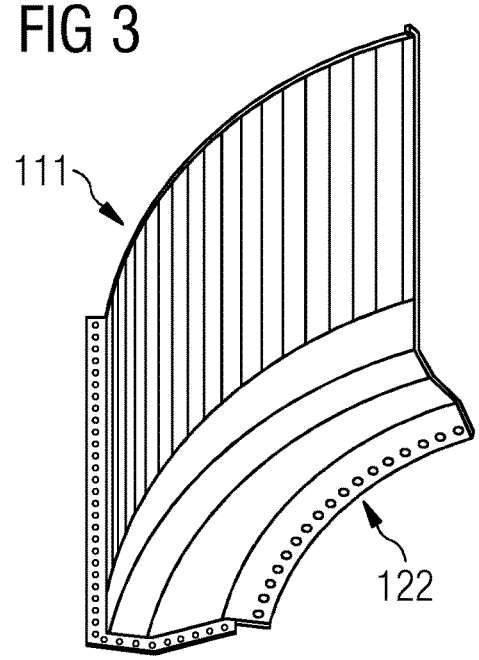
FIG. 3 shows a schematically three dimensional drawing of a proposed segmented support structure part attached to a corresponding segmented cone part of a rotor housing as shown in FIG. 1a according to an exemplary embodiment of the invention.

FIG. 3 shows a schematically three dimensional drawing of a proposed segmented support structure part 111 attached to a corresponding segmented cone part 122 of a rotor housing 100 as shown in FIG. 1a according to an exemplary embodiment of the invention. The segmented support structure part 111 shown in FIG. 3 comprises a segmented cone part 122. This segmented cone part 122 may be attached to the segmented support structure part 111 or it may be produced as a part of the segmented support structure part 111.

Figure 4:
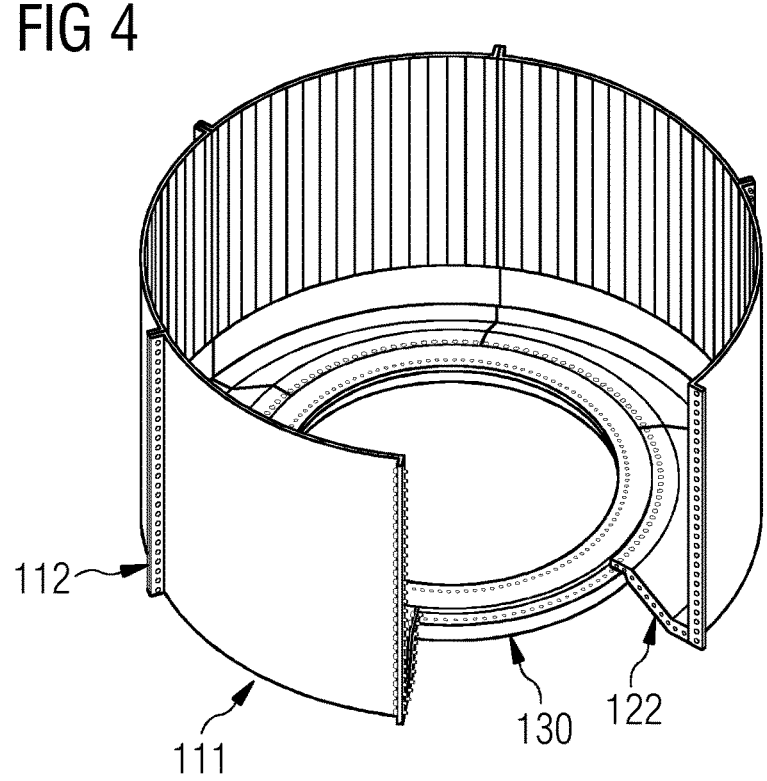
FIG. 4 shows a schematically three dimensional drawing of a part of a proposed rotor housing, wherein the support structure and the cone each are made of six segmented parts, for a generator with an external rotor according to an exemplary embodiment of the invention.

FIG. 4 shows a schematically three dimensional drawing of a part of a proposed rotor housing 100, wherein the support structure 110 and the cone 120 each are made of six segmented parts 111,122, for a generator with an external rotor according to an exemplary embodiment of the invention. The cone 120 is formed out of segmented cone parts 122, wherein the number of segmented support structure parts 111 equals the number of segmented cone parts 122. In FIG. 4, each segmented cone part 122 is made of three curved pieces, which are welded together.

Moreover, in FIG. 4 shown is a gap 112 that is formed between two segmented support structure parts 111 being attached to each other.

FIG. 5 shows a schematically three dimensional drawing of a part of a proposed rotor housing 100 similar as shown in FIG. 4, but in contrary to FIG. 4 each of the segmented cone parts 122 is made of one piece and then bended two times, for a generator with an external rotor according to an exemplary embodiment of the invention.

The support structure 110 as shown in FIG. 1a is formed out of six segmented support structure parts 111, wherein in FIG. 5 one segmented support structure part 111 and one segmented cone part are removed in order to provide a better view inside the rotor housing 100.

In FIG. 5 each of the segmented cone parts is made of one piece, which is bended two times. Therefore, each segmented cone part in FIG. 5 comprises straight edges 124, instead of the comprised curved edges of the segmented cone parts of FIG. 4. This may again reduce the production costs, as bending may be cheaper than welding.

The segmented cones parts shown in FIG. 5 could also be made of at least two parts similar as in FIG. 4 and then welded together. In this case, in FIG. 5 the welding edges of each segmented cone part would be straight lines, while in FIG. 4 the welding edges of each segmented cone part are curved.

Therefore, in FIG. 5 each segmented cone part 122 may be divided into two parts, wherein a corresponding segmented support structure part 111 may comprise one part 123 of such a divided segmented cone part 122. Moreover, each segmented cone part 122 may comprise a straight shaped side 124, wherein the straight shaped side 124 of the corresponding segmented cone part 122 may be opposed to a further side 125 (as shown in FIG. 7 as an enlarged extract of FIG. 4) of this segmented cone part 122 attached to the ring 130, thus the segmented cone parts 122 together may provide a hexagonal shape around the ring 130. Each segmented cone part 122 may be attached to one support structure part 111 and to the ring 130, each by bolting. Moreover, each segmented support structure part 111 may be attached to another support structure part 111, for example by bolting.

To summarize, each segmented cone part 122 shown in FIG. 5 may be produced either as a single part and then bended two times, providing straight bending edges 124, which may further reduce production costs, or it may be produced of at least two parts, which then are welded together, providing at least a straight bending edge 124, which may make provide a more flexible production chain/supply chain.

If a segmented cone part 122 is produced of at least two parts, a segmented support structure 111 part may comprise one 123 of these parts. This part 123 may then be attached to the other part of the segmented cone part 122, preferably by welding. With this a rotor housing 100 may be produced as shown in FIG. 4 or in FIG. 5, depending on if the welding edges 124 are formed straight or curved. If the welding edges 124 of the segmented cone parts 122 are curved, a rotor housing 100 as illustrated in FIG. 4 may be provided, if the welding edges 124 of the segmented cone parts 122 are straight, a rotor housing 100 as illustrated in FIG. 5 may be provided.

FIG. 6 shows a schematically three dimensional drawing of a proposed ring 130 for a rotor housing 100 for a generator with an external rotor according to an exemplary embodiment of the invention. The ring 130 is made of one piece and thus may be produced as a casted steel ring. The ring 130 may act as the housing for the bearings for the rotor.

FIG. 7 shows a schematically three dimensional drawing of an enlarged extract of the part of a rotor housing as shown in FIG. 5, for a generator with an external rotor according to an exemplary embodiment of the invention.

As can be seen from FIG. 7, the segmented cone part 122 is made of one piece and bended two times, providing straight shaped sides of the bending edges. The further side of the segmented cone part 125 is attached to the ring 130 by bolting.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

It should be noted that the term "attaching" may comprise bolting, riveting, welding or any other bonding of two materials, depending of the use of the materials and/or parts attached to each other. Where possible and useful, welding, bolting or riveting may be substituted by each other.

It is noted that it may also be possible in further refinements of the invention to combine features from different illustrative embodiments described herein. It should also be noted that reference signs in the claims should not be construed as limiting the scope of the claims.

In order to recapitulate the above described embodiments of the present invention one can state:

The proposed invention may lead to the use of a rotor housing, where the support structure also known as the yoke and maybe even the cone as a part of the front plate of the rotor housing is made of independent solid segments, providing segmented support structure parts and/or segmented cone parts. These solids segments may be attached together in order to provide a complete rotor housing. The rotor may be built with a certain number of these solid segments in circumferential direction. Each solid segment may be made as one piece or may again consist of smaller subparts, which may then be connected to each other for example with bolts, welds, rivets or another applicable assembly technology. Each of the solid segments may be made as casted steel segments. All the solid segments may be attached together with each other as well as with the ring that may act as the bearing ring of the rotor housing. After the magnets have been inserted into the rotor housing, the segmented support structure parts may then also be attached together with the brake disc of the generator and thereby may form a complete fixed, closed and stable rotor housing. With this strong segmented rotor housing may be provided, that may be assembled of segmented modules and a ring. Each segmented modules may comprise a segmented support structure part and a segmented cone part. Therefore, rotor housings may be produced in a simplified manner, allowing for an increased cost reduction and more flexible production of large generators with external rotors. Moreover, the segmented support structure part may be made of a different material than the segmented cone part, which may lead to lower overall production costs and/or a stability increase of the rotor housing. The disclosed may be even applied to existing generators with an external rotor, because if for any reasons the rotor of such a generator has to be replaced, making use of this device may provide a simple and cost reduced way of replacing a rotor in such a generator.

The invention claimed is:

1. A rotor housing for a generator with an external rotor, the rotor housing comprising:
   a support structure, wherein the support structure is cylindrical shaped,
   a cone, and
   a ring, wherein
   the ring and the cone are attached together at an inner side of the cone in a horizontal plane, forming a front part of the rotor housing,
   the support structure is attached to the cone at a front end of the support structure, forming a side part of the rotor housing, and
   the support structure is formed out of segmented support structure parts.

2. The rotor housing as set forth in claim 1, wherein the cone is formed out of segmented cone parts.

3. The rotor housing as set forth in claim 2, wherein the number of segmented support structure parts equals the number of segmented cone parts.

4. The rotor housing as set forth in claim 2, wherein each segmented support structure part comprises at least a part of a segmented cone part.

5. The rotor housing as set forth in claim 2, wherein the support structure is formed out of six segmented support structure parts.

6. A rotor housing for a generator with an external rotor, the rotor housing comprising:
   a support structure, wherein the support structure is cylindrical shaped, a cone, wherein the cone is formed out of segmented cone parts, and a ring, wherein the ring and the cone are attached together at an inner side of the cone in a horizontal plane, forming a front part of the rotor housing, the support structure is attached to the cone at a front end of the support structure, forming a side part of the rotor housing, and the support structure is formed out of segmented support structure parts, wherein each segmented cone part comprises a straight shaped side, and wherein the straight shaped side of the corresponding segmented cone part is opposed to a further side of this segmented cone part attached to the ring, thus the segmented cone parts together provide a hexagonal shape around the ring.

7. The rotor housing as set forth in claim 2, wherein each segmented cone part is attached to one support structure part and to the ring, each by bolting.

8. The rotor housing as set forth in claim 1, wherein each segmented support structure part is attached to another support structure part by bolting.

9. The rotor housing as set forth in claim 1, wherein a gap is formed between two segmented support structure parts being attached to each other.

10. The rotor housing as set forth in claim 9, wherein the gap between two segmented support structure parts being attached to each other, is between 0mm and 2mm.

11. The rotor housing as set forth in claim 1, wherein the ring is adapted to provide a housing for the bearing of the generator.

12. A generator with an external rotor, the generator comprising:
a rotor housing having
a support structure, wherein the support structure is cylindrical shaped,
a cone, and
a ring, wherein
the ring and the cone are attached together at an inner side of the cone in a horizontal plane, forming a front part of the rotor housing,
the support structure is attached to the cone at a front end of the support structure, forming a side part of the rotor housing, and
the support structure is formed out of segmented support structure parts.

13. A wind turbine, comprising
a generator device with an external rotor, and
the generator comprising a rotor housing according to claim 1.

14. The rotor housing as set forth in claim 9, wherein the gap between two segmented support structure parts being attached to each other, is between 0mm and 1mm.

15. The rotor housing as set fourth in claim 9, wherein the gap between two segmented support structure parts being attached to each other, is between 0mm and 0.5mm.

* * * * *